Oct. 27, 1959 — R. P. FORSBERG — 2,909,784
STITCHED MULTI-PLY CELLULAR STRUCTURE
Filed June 19, 1957
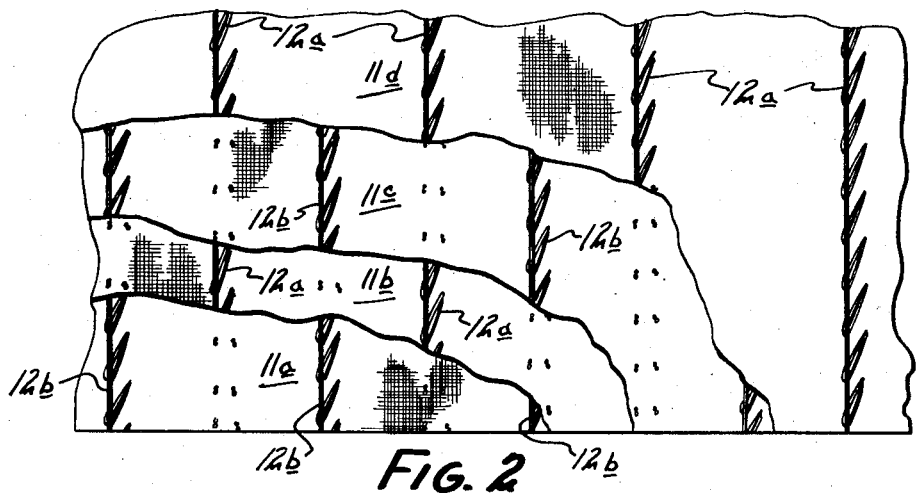
FIG. 2
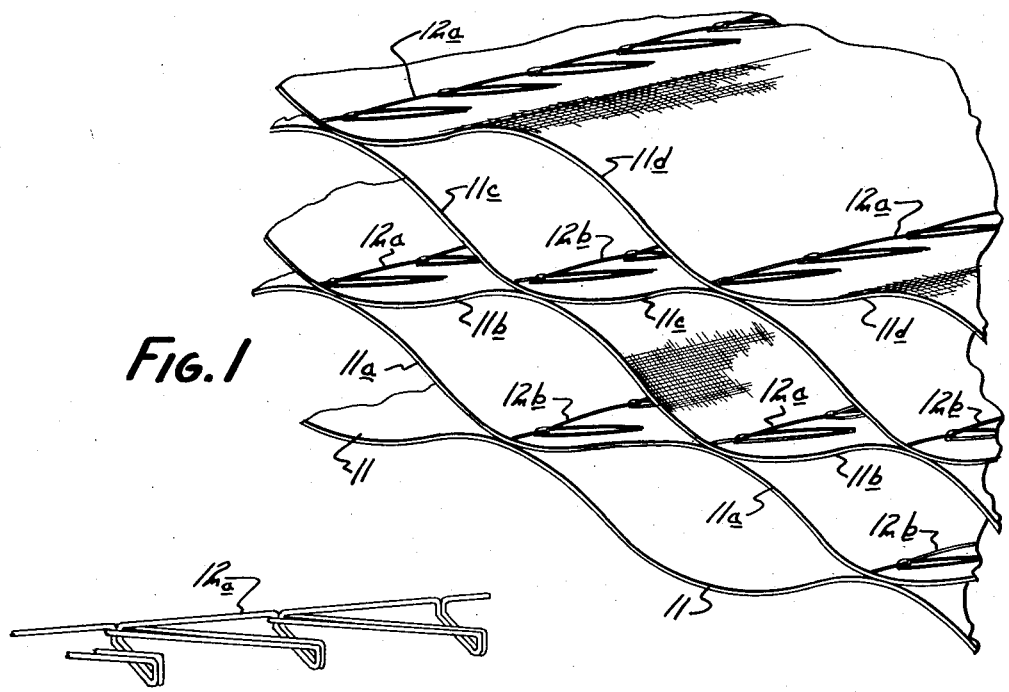
FIG. 1
FIG. 6
INVENTOR.
RICHARD P. FORSBERG
BY
Townsend and Townsend
ATTORNEYS Oct. 27, 1959   R. P. FORSBERG   2,909,784
STITCHED MULTI-PLY CELLULAR STRUCTURE
Filed June 19, 1957   2 Sheets-Sheet 2

INVENTOR.
RICHARD P. FORSBERG
BY
Townsend and Townsend
ATTORNEYS

United States Patent Office 2,909,784
Patented Oct. 27, 1959

2,909,784

STITCHED MULTI-PLY CELLULAR STRUCTURE

Richard P. Forsberg, Berkeley, Calif., assignor to Hexcel Products Inc., Berkeley, Calif., a corporation of California Application June 19, 1957, Serial No. 666,603

2 Claims. (Cl. 2—243)

This invention relates to a multiple ply sewn or stitched cellular structure and has particular reference to the art of structural honeycomb manufacture.

The particular embodiment of the present invention which is illustrated in the drawings and which will be described hereinafter in more detail comprises a plurality of webs of pliant sheet material, such as textile or glass fibre fabric material, and in which adjacent webs are sewn together along spaced parallel stitch lines. More specifically each web in the structure, except the outer two end webs, are sewn to two adjacent webs along parallel stitch lines, and with the stitch lines joining each web with one of its adjacent webs staggered relative to the stitch lines joining the said web with the other of its adjacent webs. The stitched multi-ply structure above mentioned is expandable to form an open cellular honeycomb type structure of geometric cell configuration defined by ribbons or webs stitched together at their adjoining nodes.

Although the particular use or uses to which the present invention may be put is not considered as a limitation of its scope it is contemplated that the invention will have particular utility in the manufacture of different types of reinforced honeycombs and in which the stitched multi-ply structure embodying the present invention will function as a reinforcing web or carrier. Thus for example the present invention has been found to have utility as a reinforcing web or carrier in the manufacture of certain types of resin impregnated textile or glass fabric honeycombs and in the manufacture of ceramic honeycomb.

In utilizing the present invention it is possible to fabricate a honeycomb structure from pliant unimpregnated materials such as woven or unwoven textile or glass fabrics. The quality of flexibility or pliancy of the material is in certain applications of importance particularly in fabricating reinforced honeycombs in curved configurations or with varying geometric cell configurations.

Another advantage attainable with the use of mechanically stitched honeycomb of the type embodying the present invention over adhesively bonded materials is that the nature of the adhesive bonds may impose other limitations on the particular use to be made of the structure. Thus, for example, in making reinforced resin impregnated honeycombs the impregnate must be compatible both chemically and physically with both the reinforcing web as well as the adhesive node bonds joining the web material together. In using certain types of impregnates, for example silicones, one may encounter both practical and economic problems in either bonding the web material with a silicone adhesive in the first instance, or in using a silicone impregnate that is compatible with a different type of adhesive node bonding agent. By mechanically joining the reinforcing webs by stitching as contemplated in the present invention the above enumerated problems may be minimized or eliminated.

It is also appreciated that in making reinforced resin impregnated honeycombs the strength properties of any such structure during curving, expanding or like processing of the material is proportionate in large measure to the strength of the node bonds joining the material together. In practicing the present invention the thread or fiber used to stitch and mechanically join the web material together may usually be of the same type and strength as the material from which the web material itself is fabricated, or, if desired, thread or fibers of stronger stock may be used depending on the application to which the honeycomb is to be put.

Another advantage of a stitched fibrous or fabric product of the character above referred to is that the interstices between the fibres of the web material provide through-going openings or passages through which a subsequently applied wet impregnate or coating may penetrate or flow and which, in the case of many reinforced impregnated or coated honeycomb structures, is an important and highly desirable attribute. In using adhesively bonded node structures to which wet impregnate or coating is subsequently applied, the adhesive areas usually prevent saturation or penetration of the impregnate through the bonded node areas of the reinforcing material.

Other numerous objects and advantages of the present invention will become apparent upon reading the following specification and referring to the accompanying drawings in which similar characters of reference represent corresponding parts in each of the several views.

In the drawings:

Fig. 1 is an enlarged fragmentary perspective view of a stitched honeycomb structure embodying the present invention.

Fig. 2 is a fragmentary top plan view of the structure showing portions of successive layers of material broken away.

Fig. 6 is an enlarged view showing generally the type stitch formed by the type of blind stitch machine indicated in Fig. 3.

Referring now more specifically to the drawings the structure embodying the present invention is illustrated as comprising a plurality of superposed plies or sections of pliant sheet material, such as indicated generally at 11, 11a, 11b, 11c and 11d. Each of the plies or sections 11–11d may be formed of the same type of material such as textile or glass yarn woven fabric, or, if desired it is of course possible to use sections of different kind or quality material depending on the ultimate specification desired of the product.

As shown in Figs. 1 and 2 each of the sections 11–11d are sewn or stitched node to node to an adjacent section along spaced parallel stitch lines indicated at 12a and 12b. It is observed that the interior sections 11b and 11c are each joined by stitching to two adjacent sections by alternately staggered stitch lines. For example, section 11c is shown stitched to section 11d along stitch lines 12a which are staggered relative to stitch lines 12b which join section 11c to its adjacent web 11b. As shown in Fig. 1 the stitched structure may be opened or expanded to form an open cellular structure of uniform geometric cell configuration in which the cell openings extend unidirectionally.

The honeycomb structure of the type herein above described has been fabricated utilizing standard or commercially available blind stitch sewing machine equipment without modification such as for example a blind stitch machine such as generally diseclosed in U.S. Patent No. 2,627,828 and of the type manufactured by the U.S. Blind Stitch Corp., having offices at 312 7th Avenue, New York 1, New York. Using such a machine each successive ply of the material is sewn along desired stitch lines to the ply or section immediately below it. However in manufacturing the present product when utilizing more than six to ten ply thicknesses of material it has been found to be diffcult to regulate and gauge properly the depth of blind stitch needle penetration in such manner that only the two top layers of material are stitched properly and firmly and without danger of the needle penetrating into the third ply and causing it to be stitched to the first two.

Figure 3:
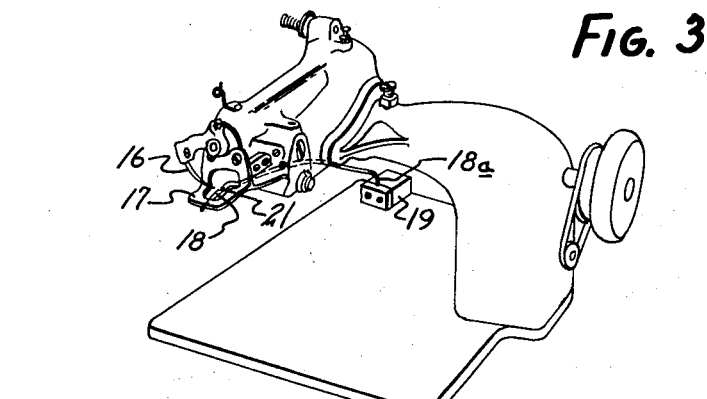
Fig. 3 is a perspective view showing substantially schematically a modified type of blind-stitch sewing machine.
Figure 4:
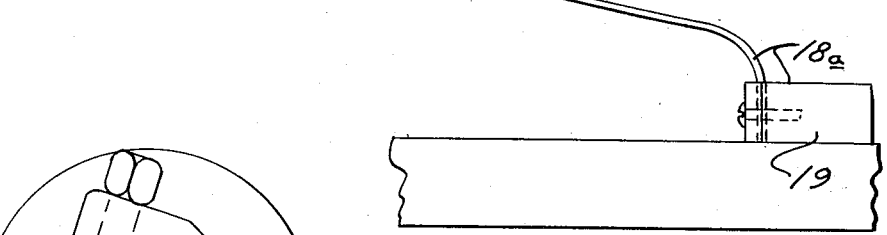
Fig. 4 is an enlarged side elevational view of a component of the modified machine.
Figure 5:
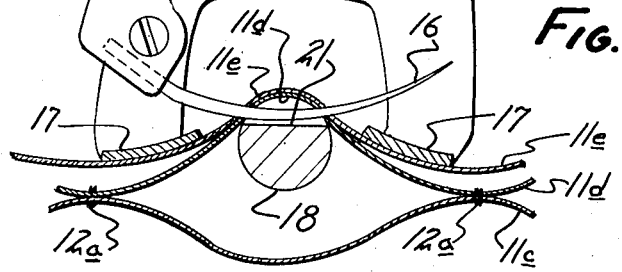
Fig. 5 is a fragmentary front elevational view partly in section of the modified machine and work material.

Figs. 3–5 indicate more or less schematically how a conventional blind stitch machine of the type above referred to may be readily modified to fabricate the present products with substantially no limitation as to number and thicknesses of the plies utilized. Fig. 5 indicates a conventional blind stitch sewing machine head including the usual oscillating transverse blind stitch needle 16 operating in conjunction with an upper work guide 17. In lieu of the more usual oscillator and gauge mechanism conventionally located beneath the upper work guide 17 for moving and gauging the work stock into proper position relative to the needle 16 I provide a fixed elongated work material guide arm 18 supported at its base and 18a to a suitable table surface support 19 whereby the unsupported length of arm 18 extends along the path of work feed and with its outer end disposed below and vertically aligned with the oscillating path of needle stroke. The guide arm 18 is curved upwardly from its base end to direct or guide the work into the locus of needle penetration whereby as the needle oscillates in an arcuate transverse path it penetrates and causes the two top plies of the material supported on the arm 18 to be stitched together. Figs. 5 and 6 show how the arm 18 may be notched as at 21 to receive the needle and to insure passage thereof through the top two plies of material which are indicated at 11d and 11c in Fig. 5.

Although the invention has been described with particular reference to stitching of textile or glass yarn fabrics into a honeycomb structure, it is contemplated that other pliant or yielding material in sheet form, such as metal foil or plastic films, may with suitable sewing equipment be employed to produce honeycomb within the broader concepts of the present invention.

Although the present invention has been described in some detail by way of illustration and example for purposes of clarity of understanding it is understood that certain changes and modifications may be made within the spirit of the invention and is limited only by the scope of the claims appended hereto.

What is claimed is:

1. A stitched multi-ply structure comprising at least several superposed webs of pliant sheet material; each web, except the outer two webs, sewn to two adjacent webs along spaced parallel stitch lines; the stitch lines joining each said web with one of its adjacent webs being staggered relative to the stitch lines joining said web with the other of its adjacent webs; said sewn webs being expandable to form an open cellular honeycomb structure.

2. A stitched multi-ply structure comprising at least several superposed webs of pliant fibrous material; each web, except the outer two webs, sewn to two adjacent webs along spaced parallel stitch lines; the stitch lines joining each said web with one of its adjacent webs being staggered relative to the stitch lines joining said web with the other of its adjacent webs; said sewn webs being expandable to form an open cellular honeycomb structure; the fibers of the web material defining interstices establishing small through-going communicating passages through each fibrous web throughout the entire areas of said webs.

References Cited in the file of this patent

UNITED STATES PATENTS

| | | |
|---|---|---|
| 2,477,852 | Bacon | Aug. 2, 1949 |
| 2,668,327 | Steele | Feb. 9, 1954 |
| 2,728,479 | Wheeler | Dec. 27, 1955 |

FOREIGN PATENTS

| | | |
|---|---|---|
| 413,408 | Great Britain | July 19, 1934 |